June 8, 1948.  E. J. ARMSTRONG  2,442,752
METHOD OF AND APPARATUS FOR EXAMINING QUARTZ
Filed April 20, 1945
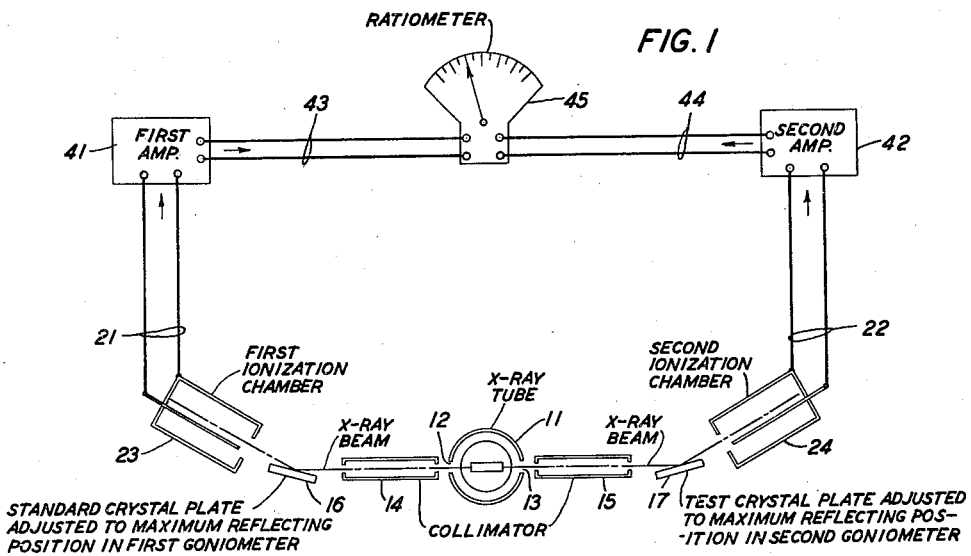
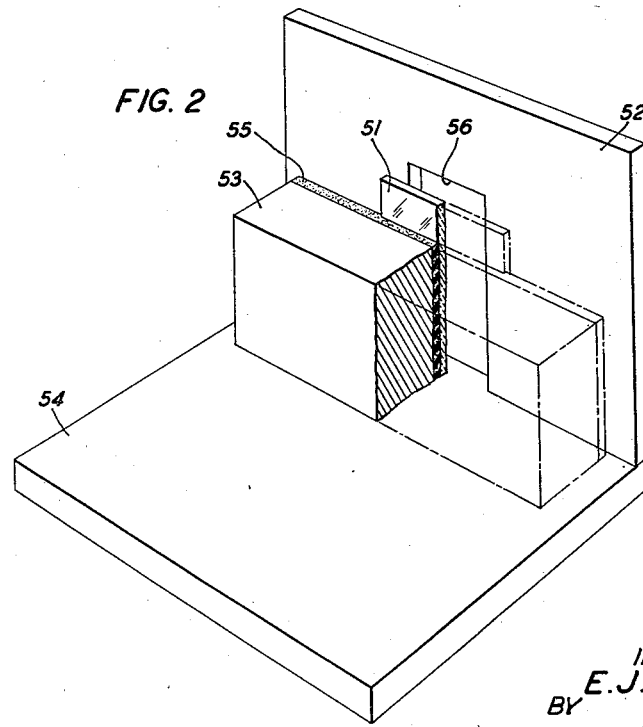
INVENTOR
E. J. ARMSTRONG
BY
E. V. Griggs
ATTORNEY Patented June 8, 1948

2,442,752

UNITED STATES PATENT OFFICE 2,442,752

METHOD OF AND APPARATUS FOR EXAMINING QUARTZ

Elizabeth J. Armstrong, New York, N. Y., assignor to Bell Telephone Laboratories, Incorporated, New York, N. Y., a corporation of New York Application April 20, 1945, Serial No. 589,388

8 Claims. (Cl. 250—83.3)

This invention relates to a method of and apparatus for testing crystals and more particularly to a method of and apparatus for determining whether the surface of a quartz piezoelectric crystal plate deviates from a properly etched condition.

An object of the invention is to facilitate the examination and classification of quartz piezoelectric crystal plates.

Another object of the invention is to facilitate the production of quartz piezoelectric crystal plates and to improve the quality thereof.

A more specific object of the invention is to determine whether the surface of a finished quartz plate deviates from a properly etched surface.

Quartz piezoelectric elements, commonly in the form of wafers and generally referred to as "crystals" or "crystal plates," are used in large numbers at present in many important connections. For example such elements are used in radio transmitters to maintain the output thereof at its exact assigned frequency value, in electrical wave filters, radio receivers, frequency standards, and many other similar applications.

These plates are usually cut from the "mother" crystal, i. e., the natural quartz, at various orientations with respect to one or more of the three sets of crystallographic axes thereof. The preparation of the plate involves a plurality of different, precise operations which it is not necessary to consider in detail here but which may be said to include, in addition to the actual sawing, inspections for the location of the axes and detection of twinning and other imperfections, X-ray examinations for checking the orientation and the direction of certain of the axes, lapping, finishing, application of electrodes, and final testing for activity and frequency. It is sufficient for our present purposes to state that by these, and other, precise operations, crystal plates are produced in quantity having the exact frequency characteristics required by the respective application contemplated for the finished plate.

While, as just indicated, crystal plates are produced to the exact frequency, subsequent users of such plates have on occasion been seriously inconvenienced to find that the plates, during the period of storage and/or transportation, have so far departed from the specified frequency as to be useless for the purpose intended. This phenomenon is usually referred to as "aging" and has proven particularly troublesome in the instance of crystals supplied to communication personnel in remote areas as here the matter of replacing crystals found unsuitable at the time of installation is often difficult and serious delay in the establishment of vital communications may result.

Various theories have been advanced as to the cause of aging and it is not the present purpose to expound any one theory as to the cause. However, it may be said in passing that, according to one quite widely accepted theory, aging is caused by a process on the surface of the crystal which resembles erosion in nature. The seemingly smooth surface of a crystal plate, after finishing by abrasion will be found, if examined under high magnification, to actually show a surface comprising hills and dales of varying magnitude. Now, cracking and breaking away of these "hills" is apt to result from strains set up in the crystal due, for example, to moisture and the resulting quartz dust is deposited on the surface of the crystal, decreasing the frequency thereof, and lowering the activity of the crystal.

Various methods of preventing the aging action have been proposed and it is now known that if the crystal plate be finished to frequency by deep etching after a proper lapping procedure a finish results which will remain stable (i e., almost no aging will take place) for long periods of time. It has been found, however, that the benefits resulting from the method referred to are largely destroyed if the etching process be followed by the use of any abrasive on the surface of the crystal. It is the practice, therefore, on the part of certain users of quartz piezoelectric crystals to specify that the crystals supplied to them be subjected to a proper lapping process and then be finished to frequency by deep etching and, further, that no abrasive be used on the surface of the crystal following the etching.

The desirability of providing means for readily testing crystals to determine whether the surface deviates from a properly etched condition, i. e., whether it has been inadequately etched or has been lapped after etching, is obvious from the above; the present invention provides such means.

The term, "deviation from a properly etched surface," as used herein, contemplates either inadequate etching of the surface or use of an abrasive on the surface (lapping) after etching. Likewise the term, "improperly etched surface" contemplates a surface either inadequately etched or one abraded (lapped) after etching.

In accordance with a specific embodiment of the invention, maximum X-ray reflection from the crystal being tested is compared with maximum X-ray reflection under identical conditions from a previously prepared "standard" in order to determine the "intensity ratio." Applicant has discovered that an intensity ratio greater than 2, the standard plate having been etched for 20 minutes in a 48 per cent hydrofluoric acid, indicates either inadequate etching or lapping after etching. The reflection data may be obtained either by testing the two crystals at separate times on the same single-goniometer set-up or the reflections may be performed at the same time through use of a novel arrangement hereinafter described, which includes two separate goniometers and a ratiometer.

A complete understanding of the novel arrangement contemplated by the present invention as well as appreciation of the various valuable features thereof may be gained from consideration of the following detailed description taken together with the annexed drawings in which:

Fig. 1 is a schematic showing of the plural-goniometer embodiment of the invention as used in testing a crystal, the various apparatus elements being shown in plan; and Fig. 2 is a perspective view of a type of crystal holder adapted for use in the arrangement contemplated by the invention, certain portions being shown in section.

Referring now to Fig. 1 a suitable X-ray tube 11 is provided, this tube being of the type provided with two or more windows or exits for X-ray beams, windows 12 and 13 being positioned 180 degrees apart as illustrated. Respective collimators 14 and 15 are provided for collimating and directing an X-ray beam against the respective crystals, i. e., standard crystal plate 16 and crystal plate 17 which is under test. It will be assumed that standard plate 16 has been prepared by etching for 20 minutes in a 48 per cent hydrofluoric acid.

The X-ray beam utilized should be one in which the radiation of a narrow band of wavelengths (the "characteristic radiation") far exceeds in intensity the radiation of other wavelengths (the "white radiation") so that the radiation which is sufficiently strong that its diffracted rays are measurable with the ionization chamber will be essentially monochromatic. An example of such radiation is that emitted by a copper target tube, operating at voltages of 20 to 40 kilovolts and with currents of 10 to 25 milliamperes. In this radiation X-rays with wavelengths around 1.5374 Å are very much stronger than the others, and X-rays with wavelengths around 1.3894 Å are somewhat stronger than the others. The X-rays with wavelengths around 1.3894 Å can be eliminated by use of a suitable "filter" such as a thin sheet of nickel.

These X-rays are then diffracted by the crystals in accordance with the Bragg law $n\lambda = 2d \sin \theta$ where $\lambda$ = the wavelength of the X-rays
$d$ = the spacing between the atomic planes.
$\theta$ = the angle between the incident (and the emergent) X-rays and the atomic planes
$n$ = an integer The axis of the ionization chamber must make an angle of $2\theta$ with the incident X-ray beam.

Crystals 16 and 17 are movably supported in suitable goniometer assemblies which may be, by way of example, of the general type illustrated on page 60 of Electronic Industries for May 1943. It is particularly desirable that both plates be supported during the test with the least possible pressure and there is shown in Fig. 2 a type of holder which is particularly adaptable to such purpose; this holder will be described in detail subsequently.

In a manner well understood in the industry and adequately described in the literature, X-rays may be "detected" by use of an ionization chamber which consists essentially of a gas-filled metallic chamber containing an electrode. A potential is maintained between the electrode and the cylinder so that, when the gas is ionized by the X-rays, the positive and negative ions produced are drawn to the oppositely charged electrodes thus constituting an electric current which is proportional to the intensity of the X-rays entering the chamber. In the present instance therefore the currents produced in the respective output circuits 21 and 22 of ionization chambers 23 and 24 will be proportional to the intensity of the X-ray beam reflected from plates 16 and 17, respectively.

Ionization chamber output circuits 21 and 22 are connected respectively to the inputs of vacuum tube amplifiers 41 and 42. The respective output circuits, 43 and 44, of the amplifiers are connected to ratiometer 45. Ratiometer 45 may be any one of several types disclosed in the art; for example, one type of ratiometer is disclosed in H. T. Faus Patent 1,918,023; July 11, 1933, while another is disclosed in S. A. Scherbatskoy et al. Patent 2,129,880; September 13, 1938. When currents are applied to ratiometer 45 over both circuits 43 and 44 simultaneously, the meter will indicate directly the ratio of the two currents. The meter may be used also to indicate the intensity of a single current applied over either circuits 43 or 44; when so used a biasing current of small, fixed value may be applied to the opposing circuit if desirable and a suitable control may be utilized to fix the maximum travel of the meter needle.

Before starting a test, or series of tests, crystal plate 16 (the standard or reference plate) is adjusted by the associated goniometer to its position of maximum X-ray reflection for a selected atomic plane, say the (02·3) plane; ratiometer 45 may be utilized for determining when the position giving maximum reflection, with consequent maximum current output, has been reached or, if desired, a separate meter associated with circuit 43 may be utilized.

After crystal plate 16 has been properly adjusted, X-ray beams of the same intensity are applied simultaneously to plate 16 and to crystal plate 17, the latter being the crystal plate which is to be tested in order to ascertain whether the surface thereof departs from a properly etched surface. (It will quite commonly transpire that, when the two goniometers have been emplaced, it will be found that the two X-ray beams emerging from their respective collimators will not be of the same intensity. To test this the same crystal plate should be placed in each crystal holder successively and the two readings compared. If one beam should be found stronger than the other, it should be cut down by filters or other means, until the two readings are equal.) As pointed out above, ratiometer 45 will indicate directly the ratio of the respective currents in the two input circuits 21 and 22. Plate 17 is adjusted by its associated goniometer to the position of its maximum reflection (for the same atomic plane as that selected in the instance of plate 16) i. e., the position at which the maximum ratio reading is obtained on meter 45. This ratio is now noted.

Applicant has discovered that an "intensity-ratio," i. e., ratio between maximum X-ray reflection from specimen being treated and maximum X-ray reflection from standard plate prepared by etching for 20 minutes in a 48 per cent hydrofluoric acid, greater than 2 is a definite indication that the surface of the specimen departs from a properly etched surface, i. e., it has either been inadequately etched or it has been lapped after etching. As each crystal plate is tested, therefore, in the manner described above, it is necessary merely to note the respective reading on ratiometer 45; it can be immediately determined from the reading whether the respective specimen has been properly finished in order to achieve minimum aging (it is assumed that the practice of "certain users" referred to above, relative to the requirement of finishing to frequency by deep etching and the requirement that no abrasive be used on the surface following the etching, are controlling).

It is contemplated, of course, that the standard plate used may be etched for a greater or less time than that referred to above and that, in such event, the significant intensity-ratio will be changed accordingly.

In carrying out the test described above, it is particularly important that the specimen being tested be so supported in the goniometer that no deformation of the specimen take place during the test; such deformation might be caused, for example, by pressure exerted by the ordinary type of spring holder. In order to avoid such deleterious effects, applicant has devised a novel arrangement for supporting the specimen with light, uniform pressure during the testing procedure; an embodiment of this novel supporting arrangement is illustrated in Fig. 2.

Referring to Fig. 2 the test specimen, in this instance crystal plate 51, is shown held in position against reference plate 52 of the holder by bar 53. Bar 53 rests on base plate 54 of the holder; the bar is not fastened to the base plate and remains in position thereon due to inertia alone. In order to reduce the pressure exerted against specimen 51 to a minimum and to increase the uniformity of this minimum pressure, a strip of sponge rubber 55 is positioned between the bar and specimen. The transmitted X-rays reach the specimen so supported through aperture 56 provided in reference plate 52.

It has been found that when this novel arrangement is used no detectable deformation of the crystal plate occurs; bar 53 exerts just sufficient pressure against the specimen to prevent it from falling back away from reference plate 52.

While the procedure contemplated may be more easily carried out by use of the multiple-goniometer arrangement as described above, it is contemplated that on occasion, it may also be practiced by use of a single goniometer set-up. This may be desirable as an economic measure under certain conditions, for example, in small shops where a single-goniometer set-up is the only X-ray equipment that is available.

The testing procedure utilizing a single-goniometer set is in general, the same as that discussed above, the single-goniometer being used for alternate reflections from the standard plate and from the plates to be tested. The standard plate is "tested" between each reading of a test plate, the filament current of the X-ray tube being so adjusted that the reflection-intensity reading of the standard remains substantially unchanged. The ratio between the maximum reflection intensity from a particular plate and that of the test specimen is recorded as the "intensity-ratio" for the particular plate.

In instances where a single goniometer is being used, it may be found desirable to adjust the meter reading of reflection from the standard plate to some convenient unit reading (for example, 1, 10, 100) so that the meter reading of reflection from the test plate will be the ratio reading (or 10 times or 100 times the ratio). This may be accomplished by adjusting the current or voltage on the X-ray tube or by other suitable methods.

As outlined above, the single-goniometer method involves reflecting from the standard plate between each observation of a test plate. This is necessary, however, only because of possible instability of the current and voltage supplies to the X-ray tube and the amplifier and, if proper steps be taken to insure stability of the current and voltage supply, it will then be necessary to reflect from the standard plate only occasionally during observation of the test plates.

While certain specific embodiments of the invention have been selected for illustration and description, the invention is not, of course, limited in its application to these embodiments. For example, the standard plate may be etched for a greater, or less, time than that described above, with a corresponding change in the significant intensity ratio. While the invention has been illustrated as applied to the examination of crystal plates, it will be apparent that it is applicable in connection with the study of surface conditions of any plane surface on any piece of a single crystal and also that it may be applied to a comparison of the surface condition of two different natural crystals. In short, the embodiments described should be taken as illustrative of the invention and not as restrictive thereof.

What is claimed is:

1. A method of testing a crystal to determine whether a surface thereof deviates from a properly etched condition which comprises the steps of reflecting an X-ray beam from a selected atomic plane of the crystal being tested, adjusting the position of said crystal in order to obtain the maximum intensity of such reflection, reflecting an X-ray beam under identical conditions from a previously prepared standard crystal, adjusting the position of said standard crystal in order to obtain the maximum intensity of reflection therefrom, and determining the ratio of said two maximum reflection intensities, the exceeding of a definite predetermined magnitude by said ratio being indicative of deviation from a properly etched surface.

2. A method of testing a crystal plate to determine whether a surface thereof deviates from a properly etched condition which comprises the steps of transmitting an X-ray beam to a selected plane of the crystal plate being tested; adjusting the position of said crystal to obtain the maximum intensity of reflection of said beam from said selected plane, simultaneously transmitting an X-ray beam under identical condition to a previously prepared standard crystal, adjusting the position of said standard crystal to obtain the maximum intensity of reflection of the X-ray beam therefrom, and indicating the ratio of said two maximum reflection intensities, a ratio of a magnitude exceeding a previously determined magnitude being indicative of an improperly etched surface of the crystal being tested.

3. Apparatus for testing a crystal to determine whether a surface thereof deviates from a properly etched condition comprising a source of X-rays, means for collimating X-rays from said source to form a first beam of X-rays and a second beam of X-rays means for supporting the crystal being tested in the path of the first beam of X-rays, means for adjusting the position of the crystal with respect to said first X-ray beam to obtain maximum intensity of reflection from a selected atomic plane of said crystal, means for producing a current of a magnitude in accordance with said maximum intensity of reflection, means for supporting a standard comparison crystal in the path of the second beam of X-rays, means for adjusting the position of said comparison crystal with respect to said second beam of X-rays to obtain maximum intensity of reflection from a selected atomic plane of said standard comparison crystal, the second-mentioned selected atomic plane corresponding to the first-mentioned atomic plane and the second-mentioned X-ray beam being of substantially the same intensity as the first-mentioned beam, means for producing a second current of a magnitude in accordance with said maximum intensity of reflection from said standard comparison crystal, and means for indicating the ratio of said two currents.

4. Apparatus for testing a crystal plate to determine whether a surface thereof deviates from a properly etched condition comprising a source of X-rays, collimating means for forming a first beam of X-rays and a second beam of X-rays from said source, means for supporting a crystal plate being tested in the path of said first beam of X-rays, said supporting means comprising a horizontal base plate, a vertical reference plate, said reference plate having an aperture therein for passage of X-rays, and means supported on said base plate and restricted in its movements thereon solely by inertia for holding the crystal plate being tested in position on said base plate with a surface thereof in contact with a surface of said reference plate and with a portion of said crystal plate opposite to the aperture in said reference plate, means for supporting a standard comparison crystal plate in the path of said second beam of X-rays, means for adjusting the position of the plate being tested with respect to the transmitted said first X-ray beam to obtain maximum intensity of reflection from a selected atomic plane of said plate being tested, means for producing a current of a magnitude in accordance with said maximum intensity of reflection, means for adjusting the position of said comparison plate with respect to said second beam of X-rays to obtain maximum intensity of reflection from a selected atomic plane of said standard comparison crystal plate, the second-mentioned selected atomic plane corresponding to the first-mentioned atomic plane and the second-mentioned X-ray beam being of substantially the same intensity as the first-mentioned beam, means for producing a second current of a magnitude in accordance with said maximum intensity of reflection from said standard comparison plate, and means for indicating the ratio of said two currents.

5. Apparatus for testing a crystal plate to determine whether a surface thereof deviates from a properly etched condition comprising a source of X-rays, means for collimating X-rays from said source to form a first beam of X-rays and a second beam of X-rays, means for supporting the crystal being tested in the path of said first X-ray beam, means for adjusting the position of the plate with respect to said first X-ray beam to obtain maximum intensity of reflection from a selected atomic plane of said crystal, means for producing a current of a magnitude in accordance with said maximum intensity of reflection, means for supporting a standard comparison crystal in the path of the second beam of X-rays, means for adjusting the position of said comparison crystal with respect to said second beam of X-rays to obtain maximum intensity of reflection from a selected atomic plane of said standard comparison crystal, the second-mentioned selected atomic plane corresponding to the first-mentioned atomic plane and the second-mentioned X-ray beam being of substantially the same intensity as the first-mentioned beam, means for producing a second current of a magnitude in accordance with said maximum intensity of reflection from said standard comparison crystal, and means for comparing the magnitudes of said two currents.

6. A method of testing a crystal plate to determine whether a surface thereof deviates from a properly etched surface which comprises comparing maximum X-ray reflection from a selected atomic plane of the plate under test with maximum X-ray reflection under identical conditions from a previously prepared standard crystal plate for determining whether the ratio of the two reflections exceeds a predetermined maximum value, exceeding of said maximum by said ratio being indicative of an improperly etched surface of the crystal being tested.

7. Apparatus for testing a quartz plate to determine whether a surface thereof deviates from a properly etched condition comprising a source of X-rays for simultaneously transmitting two separate X-ray beams of like intensities in diametrically opposite directions, adjustable means for supporting a quartz plate being tested in the path of the first of said X-ray beams in the position wherein maximum reflection of the X-ray beam by said plate is attained, adjustable means for supporting a previously prepared comparison piezoelectric plate in the path of the second of said X-ray beams in the position wherein maximum reflection of the X-ray beam by said comparison plate is attained, means controlled by reflected X-rays from said first quartz plate for producing a first current of magnitude corresponding to the intensity of said X-rays reflected by said first plate, means controlled by reflected X-rays from said comparison plate for producing a second current of magnitude corresponding to the intensity of said X-rays reflected by said comparison plate, and a ratiometer for indicating the ratio of the magnitudes of said first current and said second current.

8. A method of testing a quartz piezoelectric crystal plate to determine whether a surface thereof deviates from a properly etched condition which comprises the steps of transmitting an X-ray beam to a selected plane of the crystal plate being tested, adjusting the position of said crystal plate to obtain the maximum intensity of reflection of said beam from the selected plane, simultaneously transmitting an X-ray beam under identical conditions to a standard crystal, said standard crystal having been previously prepared by etching for 20 minutes in a 48 per cent hydrofluoric acid, adjusting the position of said standard crystal in order to obtain the maximum intensity of reflection of the X-ray beam therefrom, and indicating the ratio of said two maximum reflection intensities, a ratio greater than 2 being indicative of deviation from a properly etched condition of the surface of the crystal tested.

ELIZABETH J. ARMSTRONG.

REFERENCES CITED

The following references are of record in the file of this patent:

UNITED STATES PATENTS

| Number | Name | Date |
|---|---|---|
| 2,094,318 | Failla | Sept. 28, 1937 |
| 2,383,764 | Bond | Aug. 28, 1945 |
| 2,386,785 | Friedman | Oct. 16, 1945 |